(12) United States Patent
Swan et al.

(10) Patent No.: US 10,780,657 B2
(45) Date of Patent: Sep. 22, 2020

(54) METHOD OF FILLING VOIDS IN A FILLED SEAL CAP

(71) Applicant: 3M INNOVATIVE PROPERTIES COMPANY, St. Paul, MN (US)

(72) Inventors: Michael D. Swan, Lake Elmo, MN (US); Larry S. Hebert, Hudson, WI (US); David A. Ylitalo, Stillwater, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 135 days.

(21) Appl. No.: 15/535,145

(22) PCT Filed: Dec. 22, 2015

(86) PCT No.: PCT/US2015/067471
§ 371 (c)(1),
(2) Date: Jun. 12, 2017

(87) PCT Pub. No.: WO2016/106364
PCT Pub. Date: Jun. 30, 2016

(65) Prior Publication Data
US 2017/0361549 A1   Dec. 21, 2017

Related U.S. Application Data

(60) Provisional application No. 62/096,590, filed on Dec. 24, 2014.

(51) Int. Cl.
| | | |
|---|---|---|
| B29C 73/02 | (2006.01) | |
| F16B 33/00 | (2006.01) | |
| B29C 35/08 | (2006.01) | |
| B29C 45/76 | (2006.01) | |
| B29C 67/24 | (2006.01) | |
| B65D 41/02 | (2006.01) | |
| B29C 45/00 | (2006.01) | |

(52) U.S. Cl.
CPC ........ B29C 73/025 (2013.01); B29C 35/0888 (2013.01); B29C 45/76 (2013.01); B29C 45/7613 (2013.01); B29C 67/247 (2013.01); B65D 41/023 (2013.01); F16B 33/004 (2013.01); F16B 33/008 (2013.01); B29C 2035/0833 (2013.01); B29C 2045/0079 (2013.01); B29C 2791/001 (2013.01)

(58) Field of Classification Search
CPC ... B29C 73/025; B29C 35/0888; B29C 45/76; B29C 45/7613; B65D 41/023; F16B 33/004; F16B 33/008
See application file for complete search history.

(56) References Cited

U.S. PATENT DOCUMENTS

| | | | | |
|---|---|---|---|---|
| 3,470,787 | A | * 10/1969 | Mackie | F16B 33/004 411/377 |
| 4,382,049 | A |   5/1983 | Hofmeister | |
| 4,905,631 | A |   3/1990 | Hayes | |
| 2013/0153136 | A1 | * 6/2013 | Day | F16J 15/14 156/242 |
| 2013/0284359 | A1 | * 10/2013 | Virnelson | B65D 41/005 156/272.2 |

FOREIGN PATENT DOCUMENTS

| | | |
|---|---|---|
| WO | WO 2014-066039 | 5/2014 |
| WO | WO 2014-172302 | 10/2014 |
| WO | WO 2014-201188 | 12/2014 |

OTHER PUBLICATIONS

Omnexus Website, page Dielectric Strength, https://omnexus.specialchem.com/polymer-properties/properties/dielectric-strength#values , visited on Jan. 30, 2020 (Year: 2020).*

International Search Report for PCT International Application No. PCT/US2015/067471, dated Mar. 10, 2016, 5 pages.

* cited by examiner

*Primary Examiner* — Daniel McNally
(74) *Attorney, Agent, or Firm* — 3M IPC

(57) ABSTRACT

Methods of using and repairing seal caps as well as constructions comprising seal caps, including in some embodiments seal caps which may be useful in sealing fasteners that protrude into fuel storage cells in aircraft. In some embodiments, methods include the use of optically translucent seal cap and application of a second quantity of sealant to fill voids observed within the interior of the seal cap after cure of a first quantity of sealant.

9 Claims, No Drawings

METHOD OF FILLING VOIDS IN A FILLED SEAL CAP

FIELD OF THE DISCLOSURE

This disclosure relates to methods of using seal caps and constructions comprising seal caps, including in some embodiments those which may be useful in sealing fasteners that protrude into fuel storage cells in aircraft.

SUMMARY OF THE DISCLOSURE

Briefly, the present disclosure provides a method of sealing a fastener comprising the steps of: a) applying to a fastener a first quantity of uncured sealant; b) applying an optically translucent seal cap which defines an interior over the sealant and fastener; c) curing the first quantity of uncured sealant to form a first quantity of cured sealant; d) filling a void within the interior of the seal cap with a second quantity of uncured sealant; and e) curing the second quantity of sealant to form a second quantity of cured sealant. In an alternate embodiment, the method comprises the steps of: f) providing an optically translucent seal cap which defines an interior; g) applying a first quantity of uncured sealant to the interior of the seal cap; h) applying the seal cap and first quantity of sealant over a fastener; j) curing the first quantity of sealant to form a first quantity of cured sealant; k) filling a void within the interior of the seal cap with a second quantity of uncured sealant; and l) curing the second quantity of sealant to form a second quantity of cured sealant. In some embodiments, the step of curing the first quantity of sealant is accomplished by application of actinic radiation to the sealant through the seal cap. In some embodiments, the step of curing the second quantity of sealant is accomplished by application of actinic radiation to the sealant through the seal cap. In some embodiments, the step of filling a void within the interior of the seal cap with a second quantity of uncured sealant is accomplished by injecting a second quantity of uncured sealant into the void from a syringe. In some embodiments, the first quantity of curable sealant is optically translucent. Additional embodiments of the method of sealing a fastener of the present disclosure are described below under "Selected Embodiments."

In another aspect, the present disclosure provides a method of repairing a fastener seal comprising the steps of: m) providing a protected fastener construction comprising: i) a fastener; ii) an optically translucent seal cap which defines an interior; iii) a first quantity of cured sealant; and wherein the seal cap is positioned over the fastener such that at least a portion of the fastener resides in the interior of the seal cap; wherein the interior of the seal cap additionally contains the first quantity of cured sealant which binds the seal cap to the fastener; and wherein a void is present in a location in the interior of the seal cap; n) filling the void with a second quantity of uncured sealant; and o) curing the second quantity of sealant. In some embodiments, the step of curing the second quantity of sealant is accomplished by application of actinic radiation to the sealant through the seal cap. In some embodiments, the step of filling the void with a second quantity of uncured sealant is accomplished by injecting a second quantity of uncured sealant into the void from a syringe. In some embodiments, the first quantity of cured sealant is optically translucent. Additional embodiments of the method of repairing a fastener seal of the present disclosure are described below under "Selected Embodiments."

In another aspect, the present disclosure provides a protected fastener construction comprising: q) a fastener; r) an optically translucent seal cap which defines an interior; s) a first quantity of cured sealant; and t) a second quantity of cured sealant; wherein the seal cap is positioned over the fastener such that at least a portion of the fastener resides in the interior of the seal cap; and wherein the interior of the seal cap additionally contains the first quantity of cured sealant which binds the seal cap to the fastener; and wherein the second quantity of cured sealant at least partially fills a void located in the interior of the seal cap. In some embodiments, the first surface is an interior surface of a fuel container of an aircraft. In some embodiments, the first quantity of cured sealant is optically translucent. Additional embodiments of the protected fastener construction of the present disclosure are described below under "Selected Embodiments."

All scientific and technical terms used herein have meanings commonly used in the art unless otherwise specified.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to." It will be understood that the terms "consisting of" and "consisting essentially of" are subsumed in the term "comprising," and the like.

DETAILED DESCRIPTION

The present disclosure provides methods of using seal caps and constructions comprising seal caps.

In machine construction using rivets, bolts, and other types of fasteners, it may be beneficial to apply a sealant and seal cap to the exposed portion of a fastener to protect it from corrosion and to provide electrical insulation. The sealant/cap may also function as a barrier to the passage of fluids, particularly where the fastener protrudes into a fluid containment tank, particularly where that fluid is fuel, and most particularly where that tank is on board an aircraft. In such cases, the fastener may also function to prevent or reduce passage of electrical discharge, such as from a lightning strike, into the interior of a fuel tank. The methods according to the present disclosure may be useful in sealing fasteners in many such applications.

Traditionally aircraft structure has been made of low electrical resistance metals which are capable of dissipating the electrical energy of a lightning strike. More recently, fiber reinforced resin matrix materials have been used to fabricate many parts for aircraft, wind generators, automobiles, and other applications. Fibers are typically made of carbon, glass, ceramic or aramid, and the resin matrix is typically an organic thermosetting or thermoplastic material. Structure made from these relatively high resistance materials present less protection from the effects of a lightning strike. In some applications, metal fasteners traverse the composite wing skins. One end of a fastener may be exposed to the high energy strike environment on the exterior of the aircraft, and the other exposed to the flammable environment of the wing fuel tank. Sealants and seal caps may play an important role in minimizing the potential that such a fastener would cause a spark during a lightning strike event and ignite fuel in the wing tank.

Seal caps used in the methods according to the present disclosure are translucent or transparent. As used herein, the term "translucent" means able to transmit some portion of visible light, typically greater than 20% of light in the 360-750 nm wavelength range, in some embodiments greater than 30%, in some embodiments greater than 40%, and in some embodiments greater than 50%. In some embodiments, the seal caps according to the present invention are optically transparent, meaning transparent to the extent that the article does not prevent a viewer from resolving an image, e.g., reading text. In some embodiments, seal caps according to the present invention permit visual inspection for flaws in construction or installation or both. Translucent and transparent seal caps are disclosed in PCT Pat. App. US2014/034070, the content of which is incorporated herein by reference.

In some embodiments, the seal caps used in the methods according to the present disclosure are made of a material having a dielectric breakdown strength of greater than 1.0 kV/mm, in some embodiments greater than 5.0 kV/mm, in some embodiments greater than 10.0 kV/mm, in some embodiments greater than 15.0 kV/mm, in some embodiments greater than 30.0 kV/mm, in some embodiments greater than 40.0 kV/mm, and in some embodiments greater than 50.0 kV/mm. In some embodiments, the use of a material having a higher dielectric breakdown strength permits the manufacture of a lighter seal cap.

In some embodiments, the seal caps used in the methods according to the present disclosure are made of a material having a dielectric breakdown strength of greater than 1.0 kV/mm, in some embodiments greater than 5.0 kV/mm, in some embodiments greater than 10.0 kV/mm, in some embodiments greater than 15.0 kV/mm, in some embodiments greater than 30.0 kV/mm, in some embodiments greater than 40.0 kV/mm, and in some embodiments greater than 50.0 kV/mm. In some embodiments, the use of a material having a higher dielectric breakdown strength permits the manufacture of a lighter seal cap.

In some embodiments, the seal caps used in the methods according to the present disclosure are thin-walled. In some embodiments, the seal caps have an average wall thickness of less than 1.5 mm, in some embodiments less than 1.2 mm, in some embodiments less than 1.0 mm, in some embodiments less than 0.5 mm, in some embodiments less than 0.2 mm, in some embodiments less than 0.1 mm, and in some embodiments less than 0.08 mm.

The seal caps may be made of any suitable material. In some embodiments, the material is jet fuel resistant. In some embodiments, the material has a TB (brittle temperature) below −20° C. In some embodiments, the seal cap comprises a polyurethane polymer. In some embodiments, the seal cap comprises a polythioether polymer. In some embodiments, the seal cap comprises a polysulfide polymer. In some embodiments, the seal cap comprises a fluorinated thermoplastic polymer. In some embodiments, the seal cap comprises a THV polymer. In some embodiments, the seal cap comprises a fluorinated thermoset polymer. In some embodiments, the seal cap comprises a engineering thermoplastic. In some embodiments, the seal cap comprises a PEEK polymer. In some embodiments, the seal cap comprises a mixture of a polymer and a nanoparticulate filler. In some embodiments, the seal cap comprises a mixture of a polymer and a nanoparticulate curative. In some embodiments, the seal cap comprises no fillers or other particulates having an average particle size greater than 10 nm, in some embodiments not greater than 5 nm, and in some embodiments not greater than 1 nm.

In some embodiments, the seal cap and sealant comprise different materials. In some embodiments, the seal cap and sealant do not comprise different materials.

In some embodiments, the seal cap is at least partially filled with sealant prior to application to a fastener. In some embodiments, the seal cap is applied to a fastener after application of sealant to the fastener. In some embodiments, the fastener penetrates a substrate article. In some embodiments, the fastener protrudes from a surface of a substrate article. In some embodiments the substrate article is a composite material. In some embodiments, the substrate article is a epoxy matrix and glass or carbon fiber composite material. In some embodiments, every portion of the fastener which protrudes from the substrate article is covered by cured sealant or seal cap or both. In some embodiments, every portion of the fastener which protrudes from the substrate article is covered by cured sealant.

The sealant may be any suitable material. In some embodiments, the material is translucent or transparent. In some embodiments, the material is jet fuel resistant. In some embodiments, the material has a TB (brittle temperature) below −20° C. In some embodiments, the sealant comprises a polyurethane polymer. In some embodiments, the sealant comprises a polythioether polymer. In some embodiments, the sealant comprises a polysulfide polymer. In some embodiments, the sealant comprises a mixture of a polymer and a nanoparticulate filler. In some embodiments, the sealant comprises a mixture of a polymer and a nanoparticulate curative. In some embodiments, the seal cap comprises no fillers or other particulates having an average particle size greater than 10 nm, in some embodiments not greater than 5 nm, and in some embodiments not greater than 1 nm.

The seal cap material and sealant material may be chosen such that strong bonds are formed between the sealant and the seal cap. The sealant material may be chosen such that strong bonds are formed between the sealant and the substrate. Optionally, the sealant material may be chosen such that strong bonds are formed between the sealant and the fastener.

After application of seal cap and sealant to a fastener the sealant is typically cured. In some embodiments, the sealant is a radiation cured sealant. In some embodiments, the sealant is cured by application of actinic radiation to the sealant. In some embodiments, the sealant is cured by application of green light to the sealant. In some embodiments, the sealant is cured by application of blue light to the sealant. In some embodiments, the sealant is cured by application of violet light to the sealant. In some embodiments, the sealant is cured by application of UV light to the sealant. In some embodiments, the sealant is cured by application of radiation to the sealant through a translucent seal cap. In some embodiments, the sealant is substantially fully cured in less than 60 seconds, in some embodiments less than 30 seconds, and in some embodiments less than 10 seconds. In some embodiments, cure is accomplished by addition of a curing agent shortly prior to use. In some embodiments, cure is accomplished by heat cure at ambient conditions. In some embodiments, cure is accomplished by heat cure by application of heat from a heat source.

In some embodiments, a combination seal and seal cap is molded in place over a fastener using a seal cap mold. In some embodiments, the seal cap mold is translucent or transparent to allow inspection and radiation cure of the form-in place seal and seal cap.

Voids may develop in sealant during installation as a consequence of trapped air in the sealant or seal cap. Repair of such voids by removal and replacement of the defective cap and sealant is time consuming, expensive and may result in production delays.

The method according to the present disclosure allows detection and repair of seal caps containing voids.

SELECTED EMBODIMENTS

The following numbered embodiments are intended to further illustrate the present disclosure but should not be construed to unduly limit this disclosure.

1. A method of sealing a fastener comprising the steps of:
   a) applying to a fastener a first quantity of uncured sealant;
   b) applying an optically translucent seal cap which defines an interior over the sealant and fastener;
   c) curing the first quantity of uncured sealant to form a first quantity of cured sealant;
   d) filling a void within the interior of the seal cap with a second quantity of uncured sealant; and
   e) curing the second quantity of sealant to form a second quantity of cured sealant.
2. A method of sealing a fastener comprising the steps of:
   f) providing an optically translucent seal cap which defines an interior;
   g) applying a first quantity of uncured sealant to the interior of the seal cap;
   h) applying the seal cap and first quantity of sealant over a fastener;
   j) curing the first quantity of sealant to form a first quantity of cured sealant;
   k) filling a void within the interior of the seal cap with a second quantity of uncured sealant; and
   l) curing the second quantity of sealant to form a second quantity of cured sealant.
3. The method according to embodiment 1 or 2 wherein the fastener protrudes from a first surface of a substrate article and wherein, after cure of the second quantity of sealant, every portion of the fastener which protrudes from the first surface of the substrate article is covered by cured sealant or seal cap or both.
4. The method according to any of the preceding embodiments wherein the step of curing the first quantity of sealant is accomplished by application of actinic radiation to the sealant through the seal cap.
5. The method according to any of the preceding embodiments wherein the step of curing the second quantity of sealant is accomplished by application of actinic radiation to the sealant through the seal cap.
6. The method according to any of the preceding embodiments wherein the seal cap is optically transparent.
7. The method according to any of the preceding embodiments wherein the step of filling a void within the interior of the seal cap with a second quantity of uncured sealant is accomplished by injecting a second quantity of uncured sealant into the void from a syringe.
8. The method according to any of the preceding embodiments wherein the first quantity of uncured sealant and the second quantity of uncured sealant comprise different materials.
9. The method according to any of embodiments 1-7 wherein the first quantity of uncured sealant and the second quantity of uncured sealant do not comprise different materials.
10. The method according to any of embodiments 1-7 wherein the first quantity of uncured sealant and the second quantity of uncured sealant do not comprise different curable component materials.
11. The method according to any of the preceding embodiments wherein the first quantity of uncured sealant cures to form a first quantity of cured sealant and wherein the seal cap and first quantity of cured sealant comprise different materials.
12. The method according to any of embodiments 1-10 wherein the first quantity of uncured sealant cures to form a first quantity of cured sealant, wherein the seal cap and the first quantity of cured sealant do not comprise different materials.
13. The method according to any of embodiments 1-10 wherein the seal cap is made of a third cured sealant material obtained by cure of a third curable sealant material, and wherein the first quantity of curable sealant and the third curable sealant material do not comprise different curable component materials.
14. The method according to any of the preceding embodiments wherein the first quantity of curable sealant is optically translucent.
15. The method according to any of the preceding embodiments wherein the first quantity of curable sealant is optically transparent.
16. The method according to any of the preceding embodiments wherein the second quantity of curable sealant is optically translucent.
17. The method according to any of the preceding embodiments wherein the second quantity of curable sealant is optically transparent.
18. The method according to any of embodiments 1-15 wherein the second quantity of curable sealant is optically opaque.
19. A method of repairing a fastener seal comprising the steps of:
   m) providing a protected fastener construction comprising:
      i) a fastener;
      ii) an optically translucent seal cap which defines an interior;
      iii) a first quantity of cured sealant; and
      wherein the seal cap is positioned over the fastener such that at least a portion of the fastener resides in the interior of the seal cap;
      wherein the interior of the seal cap additionally contains the first quantity of cured sealant which binds the seal cap to the fastener; and
      wherein a void is present in a location in the interior of the seal cap;
   n) filling the void with a second quantity of uncured sealant; and
   o) curing the second quantity of sealant.
20. The method according to embodiment 19 wherein the fastener protrudes from a first surface of a substrate article and wherein, after cure of the second quantity of sealant, every portion of the fastener which protrudes from the first surface of the substrate article is covered by cured sealant or seal cap or both.

21. The method according to any of embodiments 19-20 wherein the step of curing the second quantity of sealant is accomplished by application of actinic radiation to the sealant through the seal cap.

22. The method according to any of embodiments 19-21 wherein the seal cap is optically transparent.

23. The method according to any of embodiments 19-22 wherein the step of filling the void with a second quantity of uncured sealant is accomplished by injecting a second quantity of uncured sealant into the void from a syringe.

24. The method according to any of embodiments 19-23 wherein the first quantity of cured sealant and the seal cap comprise different materials.

25. The method according to any of embodiments 19-23 wherein the first quantity of cured sealant and the seal cap do not comprise different materials.

26. The method according to any of embodiments 19-23 wherein the first quantity of cured sealant is derived from a first quantity of uncured sealant and the seal cap is made by cure of a third curable sealant material, and wherein the first quantity of curable sealant and the third curable sealant material do not comprise different curable component materials.

27. The method according to any of embodiments 19-26 wherein the second quantity of uncured sealant cures to form a second quantity of cured sealant and wherein the first quantity of cured sealant and the second quantity of cured sealant comprise different materials.

28. The method according to any of embodiments 19-26 wherein the second quantity of uncured sealant cures to form a second quantity of cured sealant and wherein the first quantity of cured sealant and the second quantity of cured sealant do not comprise different materials.

29. The method according to any of embodiments 19-23 wherein the first quantity of cured sealant is derived from a first quantity of uncured sealant, and wherein the first quantity of curable sealant and the second quantity of uncured sealant do not comprise different curable component materials.

30. The method according to any of embodiments 19-29 wherein the first quantity of cured sealant is optically translucent.

31. The method according to any of embodiments 19-29 wherein the first quantity of cured sealant is optically transparent.

32. The method according to any of embodiments 19-31 wherein the second quantity of uncured sealant is optically translucent.

33. The method according to any of embodiments 19-31 wherein the second quantity of uncured sealant is optically transparent.

34. The method according to any of embodiments 19-31 wherein the second quantity of uncured sealant is optically opaque.

35. A protected fastener construction comprising:
   q) a fastener;
   r) an optically translucent seal cap which defines an interior;
   s) a first quantity of cured sealant; and
   t) a second quantity of cured sealant;
wherein the seal cap is positioned over the fastener such that at least a portion of the fastener resides in the interior of the seal cap; and
wherein the interior of the seal cap additionally contains the first quantity of cured sealant which binds the seal cap to the fastener; and wherein the second quantity of cured sealant at least partially fills a void located in the interior of the seal cap.

36. The protected fastener construction according to embodiment 35 wherein the fastener protrudes from a first surface of a substrate article and wherein every portion of the fastener which protrudes from the first surface of the substrate article is covered by cured sealant or seal cap or both.

37. The protected fastener construction according to embodiment 35 or 36 wherein said first surface is an interior surface of a fuel container of an aircraft.

38. The protected fastener construction according to any of embodiments 35-37 wherein the seal cap is optically transparent.

39. The protected fastener construction according to any of embodiments 35-38 wherein the first quantity of cured sealant is optically translucent.

40. The protected fastener construction according to any of embodiments 35-38 wherein the first quantity of cured sealant is optically transparent.

41. The protected fastener construction according to any of embodiments 35-40 wherein the second quantity of cured sealant is optically translucent.

42. The protected fastener construction according to any of embodiments 35-40 wherein the second quantity of cured sealant is optically transparent.

43. The protected fastener construction according to any of embodiments 35-40 wherein the second quantity of cured sealant is optically opaque.

44. The protected fastener construction according to any of embodiments 35-43 wherein the seal cap comprises a polyurethane polymer.

45. The protected fastener construction according to any of embodiments 35-44 wherein the seal cap comprises a polythioether polymer.

46. The protected fastener construction according to any of embodiments 35-45 wherein the first quantity of cured sealant comprises a polyurethane polymer.

47. The protected fastener construction according to any of embodiments 35-46 wherein the first quantity of cured sealant comprises a polythioether polymer.

48. The protected fastener construction according to any of embodiments 35-47 wherein the second quantity of cured sealant comprises a polyurethane polymer.

49. The protected fastener construction according to any of embodiments 35-48 wherein the second quantity of cured sealant comprises a polythioether polymer.

50. The method according to any of embodiments 1-34 wherein the seal cap comprises a polyurethane polymer.

51. The method according to any of embodiments 1-34 or 50 wherein the seal cap comprises a polythioether polymer.

52. The method according to any of embodiments 1-34 or 50-51 wherein the first quantity of cured sealant comprises a polyurethane polymer.

53. The method according to any of embodiments 1-34 or 50-52 wherein the first quantity of cured sealant comprises a polythioether polymer.

54. The method according to any of embodiments 1-34 or 50-53 wherein the second quantity of cured sealant comprises a polyurethane polymer.

55. The method according to any of embodiments 1-34 or 50-54 wherein the second quantity of cured sealant comprises a polythioether polymer.

Objects and advantages of this disclosure are further illustrated by the following examples, but the particular materials and amounts thereof recited in these examples, as well as other conditions and details, should not be construed to unduly limit this disclosure.

EXAMPLES

Unless otherwise noted, all reagents were obtained or are available from Sigma-Aldrich Company, St. Louis, Mo., or may be synthesized by known methods. Unless otherwise reported, all ratios are by weight percent.

The following abbreviations are used to describe the examples:

| | |
|---|---|
| ° C.: | degrees Centigrade |
| ° F.: | degrees Fahrenheit |
| cm: | centimeter |
| kPa: | kilo Pascals |
| mL: | milliliter |
| mm: | millimeter |
| psi: | pounds per square inch |

Materials

Abbreviations for the materials used in the examples are as follows:

AC-240: A gray two-part polysulfide-based sealant, having a cured specific gravity of 1.61, obtained under the trade designation "AEROSPACE SEALANT AC-240 CLASS B" from 3M Company, St. Paul, Minn.

DABCO: 1,4-Diazabicyclo[2.2.2]octane, obtained under the trade designation "DABCO" from Air Products & Chemicals, Inc., Allentown, Pa.

DMDO: 1,8-Dimercapto-3,6-dioxaoctane, obtained from Arkena, Inc., King of Prussia, Pa.

DVE-3: Triethyleneglycol divinylether, obtained under the trade designation "RAPI-CURE DVE-3" from Ashland Specialty Ingredients, Wilmington, Del.

E-8220: A diglycidylether of bisphenol F, obtained under the trade designation "EPALLOY 8220" from Emerald Performance Materials, LLC, Cuyahoga Falls, Ohio.

GE-30: Trimethylolpropane triglycidylether, obtained under the trade designation "ERISYS GE-30" from Emerald Performance Materials Company.

TAC: Triallylcyanurate, obtained from Sartomer, Inc., Exton, Pa.

VAZO-67: 2,2'-azobis(2-methylbutyronitrile), obtained under the trade designation "VAZO-67" from E.I. du Dupont de Nemours and Company, Wilmington, Del.

Liquid Polythioether Polymer (PTE).

A liquid polythioether polymer was prepared as follows: Into a 1-liter round bottom flask equipped with an air driven stirrer, thermometer, and a dropping funnel, was added 407.4 grams (2.24 moles) DMDO, 12.63 grams (0.05 moles) TAC and 0.1 grams of VAZO-67. The system was flushed with nitrogen and the mixture was stirred for approximately 45 minutes at 60° C. To this mixture was added, drop wise over 45 minutes, 380 grams (1.88 moles) DVE-3. An additional 0.3 grams VAZO-67 was added in small increments and the mixture maintained at between 70-80° C. for about 6 hours, followed by 10 minutes of vacuum degassing at 100° C.

Composite Test Panels

Composite panels for lighting strike testing and seal cap installation were made using the follow materials and methods. Ten layers of unidirectional pre-preg, type "P2353W-19-305", obtained from Toray Composites (America), Inc., Tacoma, Wash., were oriented at 45, 135, 0, 90, 0, 0, 90, 0, 135 and 45 degrees to give a balanced structure. A layer of woven graphite fabric, type "CYCOM 970/PWC T300 3K NT" from Cytec Industries, Inc., Woodland Park, N.J., was placed on each side of the 10-ply stack of pre-preg. The panel's size was nominally 12 by 12 inches (30.48 by 30.48 cm). The lay-up was then bagged using standard autoclave bagging practices and cured in an autoclave at 90 psi (620.5 kPa) under full vacuum at 350° F. (176.7° C.) for 2 hours. The panels were then cut in half and match drilled with ten holes to take Hi-Shear fastener shanks, Part No. "HL10VAZ6-3", obtained from Peerless Aerospace Fastener Co., Farmington, N.Y. The panels were drilled such that there was an overlap of 1 inch (2.54 cm) with the fasteners uniformly spaced along the center of the overlap joint. The two panels halves were joined together using the above mentioned shank and collar assembly, Part No. "HL94W6", also from Peerless Aerospace Fastener Co. The joint was wetted with AC-240 placed between the two panels and into the holes before tightening the fasteners. The final test panel had 10 fasteners centrally located in the overlap joint spaced uniformly across its 10 inch (25.4 cm) width.

Seal Cap

A transparent polythioether seal cap was prepared as follows: 100 grams PTE-2 was homogeneously mixed with 6.78 grams GE-30, 4.52 grams E-8220 and 1.00 gram DABCO. Part of this mixture was then poured into the female tool of an 8 by 8 inch (20.32 by 20.32 cm) 9-cavity aluminum seal cap mold, the cavities were designed to give a frusto-conical shaped cap with a base diameter of 15 mm a height of 15 mm and a wall thickness of 2.5 mm. The male tool closed the mold and the mixture cured for 3 hours at 75° F. (23.9° C.), followed by 1 hour at 130° F. (54.4° C.), after which the mold was cooled to 70° F. (21.1° C.) before opening. The resulting translucent seal cap was then removed from the tool.

Clear Resin

A clear resin was made as follows. 100 grams PTE was homogeneously mixed with 6.78 grams GE-30, 4.52 grams E-8220 and 1.00 gram DABCO at 21° C.

Example

The clear resin was poured into a transparent polythioether seal cap, and the filled cap then positioned onto a fastener on the composite panel, such that a bubble was observed to form in the resin during assembly. The sealant filled cap was then cured at 21° C. for 24 hours. This resulted in a fastener protected by a cured, but defective, sealant filled translucent polythioether seal cap. Freshly prepared clear resin was then injected through the distal end of the seal cap by means of a 5 mL glass syringe having a course 18 gauge needle. Sufficient resin was transferred until excess resin oozed out through the injection site, thereby ensuring the air bubble was fully exuded from the filled seal cap. The needle was then retracted and the excess resin immediately wiped off the cap exterior. The seal cap was then cured for 24 hours at 21° C., resulting in a fastener protected by a defect-free repaired seal cap.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A method of sealing a fastener comprising the steps of:
    f) providing an optically translucent seal cap which defines an interior, the seal cap having an average wall thickness of less than 0.5 mm;

g) applying a first quantity of uncured sealant to the interior of the seal cap;
h) applying the seal cap and first quantity of sealant over a fastener;
j) curing the first quantity of sealant to form a first quantity of cured sealant;
k) filling a void within the interior of the seal cap with a second quantity of uncured sealant; and
l) curing the second quantity of sealant to form a second quantity of cured sealant.

2. The method according to claim 1 wherein the step of curing the first quantity of sealant is accomplished by application of actinic radiation to the sealant through the seal cap.

3. The method according to claim 1 wherein the step of curing the second quantity of sealant is accomplished by application of actinic radiation to the sealant through the seal cap.

4. The method according to claim 1 wherein the step of filling a void within the interior of the seal cap with a second quantity of uncured sealant is accomplished by injecting a second quantity of uncured sealant into the void from a syringe.

5. The method according to claim 1 wherein the first quantity of curable sealant is optically translucent.

6. A method of repairing a fastener seal comprising the steps of:
m) providing a protected fastener construction comprising:
  i) a fastener;
  ii) an optically translucent seal cap which defines an interior;
  iii) a first quantity of cured sealant; and
  wherein the seal cap is positioned over the fastener such that at least a portion of the fastener resides in the interior of the seal cap;
  wherein the interior of the seal cap additionally contains the first quantity of cured sealant which binds the seal cap to the fastener;
  wherein the seal cap includes a polyurethane polymer; and
  wherein a void is present in a location in the interior of the seal cap;
n) filling the void with a second quantity of uncured sealant; and
o) curing the second quantity of sealant.

7. The method according to claim 6 wherein the step of curing the second quantity of sealant is accomplished by application of actinic radiation to the sealant through the seal cap.

8. The method according to claim 6 wherein the step of filling the void with a second quantity of uncured sealant is accomplished by injecting a second quantity of uncured sealant into the void from a syringe.

9. The method according to claim 6 wherein the first quantity of cured sealant is optically translucent.

* * * * *